United States Patent [19]

Chave

[11] Patent Number: 4,893,788

[45] Date of Patent: Jan. 16, 1990

[54] FENCE CLIP

[75] Inventor: Barry J. Chave, Auckland, New Zealand

[73] Assignee: Techlink Development Limited, Auckland, New Zealand

[21] Appl. No.: 263,413

[22] Filed: Oct. 24, 1988

[51] Int. Cl.⁴ .............................................. B21F 27/08
[52] U.S. Cl. ........................................ 256/47; 403/397
[58] Field of Search ..................... 256/48, 10; 403/397

[56] References Cited

U.S. PATENT DOCUMENTS

| | | | |
|---|---|---|---|
| 570,646 | 11/1896 | Neilson | 403/397 |
| 593,868 | 11/1897 | Walter | 403/397 |
| 2,929,121 | 3/1960 | Tinnerman | 403/397 |
| 3,633,252 | 1/1972 | Williams | 403/397 |
| 3,675,275 | 7/1972 | Arblaster | 248/75 |
| 3,883,934 | 5/1975 | Rochfort | 248/65 |

FOREIGN PATENT DOCUMENTS

| | | | |
|---|---|---|---|
| 2302436 | 2/1975 | France | 403/397 |
| 184850 | 10/1980 | New Zealand . | |
| 190367 | 12/1984 | New Zealand . | |
| 200667 | 3/1985 | New Zealand . | |
| 730065 | 5/1955 | United Kingdom . | |
| 1062894 | 3/1967 | United Kingdom . | |
| 1335452 | 10/1973 | United Kingdom . | |
| 1474901 | 5/1977 | United Kingdom . | |
| 2027107 | 2/1980 | United Kingdom . | |

OTHER PUBLICATIONS

Albright, S. L., "Torsion Spring Design", pp. 48 and 126, undated.

Primary Examiner—Andrew V. Kundrat
Assistant Examiner—Carol I. Bordas
Attorney, Agent, or Firm—Wenderoth, Lind & Ponack

[57] ABSTRACT

A fence clip to hold a wire, tape, or the like, in particular electrically conducting wire or tape, has a pair of spaced apart loops lying in planes inclined one to another. The fence clip has a release member to move the loops towards parallel planes, and a holding member to hold the wire, tape, or the like. The loops are dimensioned so that the area of the loops when in the parallel planes allows the loops to be placed on a fence post or standard, yet when the planes are at a sufficiently inclined angle one to the other the loops will grip said post or standard.

The fence clip is formed from wire or the like elongated material.

6 Claims, 2 Drawing Sheets

FENCE CLIP

Field of the Invention

This invention relates to a fence clip and has been devised particularly though not solely for use in connecting electrically conducting wire or tape to fence posts or standards.

SUMMARY OF THE INVENTION

It is an object of the present invention to provide a fence clip which will at least provide the public with a useful choice.

Accordingly in one aspect the invention consists in a fence clip formed from wire or the like elongated material, said fence clip comprising a pair of spaced apart loops lying in planes inclined one to another, release means to move said loops towards parallel planes, and holding means to hold a wire, tape or the like, said loops being dimensioned so that the area of said loops in said parallel planes allows said loops to be placed on a fence post or standard but so that with said planes at a sufficiently inclined angle one to the other said loops will grip said post or standard.

In another aspect the invention consists in a fence clip having holding means to hold a wire, tape or the like, members defining a pair of apertures, and means to vary the apparent size of said apertures when viewed along an axis passing through both apertures.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DECSRIPTION OF THE DRAWINGS

One preferred form of the invention will now be described with reference to the accompanying drawings in which, FIG. 1 is a side elevation of a fence clip according to one preferred form of the invention, FIG. 2 is a view on A in FIG. 1, FIG. 3 is a view on B in FIG. 1, FIG. 4 is a perspective view of the fence clip of FIGS. 1 to 3 in use on a fence post or standard, FIGS. 5 and 6 are views as in FIG. 4 showing one alternative method of use of the fence clip of the invention, and FIGS. 7a and 7b, 8a and 8b, and 9a and 9b show further alternative techniques for in use engaging the fence clip of the invention with wire or tape and a fence post or standard.

DESCRIPTION OF THE PREFERRED EMBODIMENTS

Figure 1:
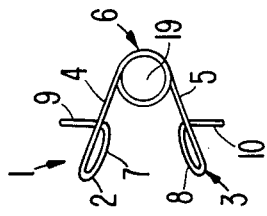

Referring to the drawings a fence clip 1 is formed from an elongated material such as wire.

The fence clip 1 has a pair of loops 2 and 3 which are spaced apart.

Figure 2:
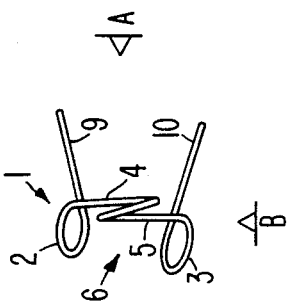

The loops 2 and 3 are formed at an angle one to the other as can be seen for example in FIGS. 1 and 2, being held apart and angled by parts 4 and 5 of the elongated material between the loops 2 and 3, and a holding part 6 to support a wire or tape. The parts 4 and 5 hold the loops at for example the angle shown in FIG. 2 but also the loops 2 and 3 are twisted so that they are inclined to each other as can be seen in FIG. 2, where the rear parts 7 and 8 of the loops are closer together than the parts 4 and 5.

Release means are provided to urge loops 2 and 3 into parallel planes and these release means may comprise the ends 9 and 10 of the elongated material which forms the loops, the loops 2 and 3 each being a single loop with the ends 9 and 10 extending somewhat parallel to each other but being a little outwardly turned again as can be seen in FIG. 2.

The parts 4 and 5 are also at an angle one to the other along two axes as can be seen by comparing the parts 4 and 5 in FIG. 2 where a fairly small angle occurs between parts 4 and 5, and the parts 4 and 5 in FIG. 1 where the distortion from parallel is substantially less.

Figure 4:
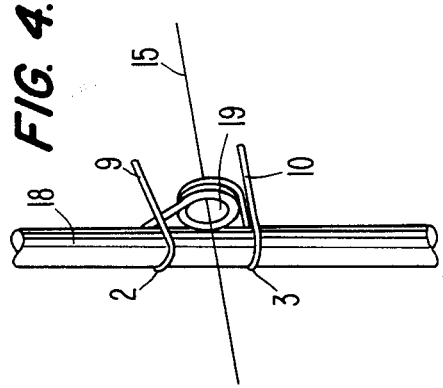
Figure 3:
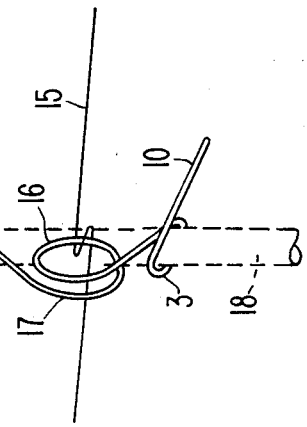

The holding means 6 for the tape or wire 15 in FIG. 4 also comprises a loop of the elongated material, the loop 6 having more than one turn so that overlapping parts of loop 6 such as parts 16 and 17 are spaced apart.

As will be apparent, the clip can be made in either "left" or "right-handed" configurations.

The use of the invention is as follows.

Figure 5:
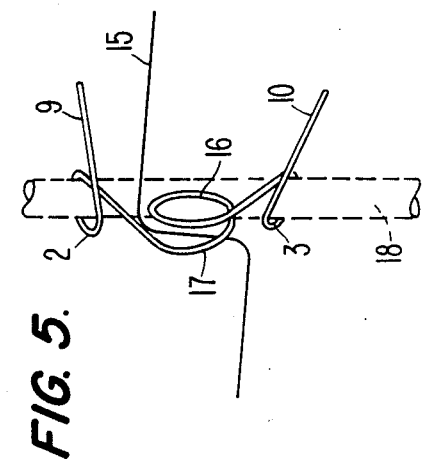
Figure 6:
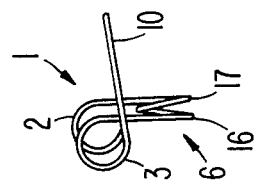

In one preferred technique, as illustrated by FIGS. 5 and 6, the clip is firstly placed on a post or standard 18. The parts 9 and 10 of the clip have pressure applied for example by the fingers of the user and this will have the effect of moving the parts 9 and 10 towards each other over a fulcrum formed by the parts 4 and 5. Thus the pressure has the effect also of moving the parts 4 and 5 as well as the parts 9 and 10. The loops 2 and 3 are also forced towards substantially parallel planes. The size of the loops is such that in this configuration the loops 2 and 3 will pass downwardly over the fence post or standard 18 but when the pressure on the parts 9 and 10 is released the loops 2 and 3 will move towards their original position thereby reducing the visible aperture area when viewed along the longitudinal axis of the post, through both apertures, thereby causing the loops 2 and 3 to grip the post or standard 18. The posts are then set out in the desired fenceline configuration. The wire or tape 15 is secured at one terminating end, for example using one of the clips 1, and then retained by each appropriate clip along the line by presenting the wire to the gap between the overlapping loop parts 16 and 17 as shown in FIG. 5, and bringing the wire down and rearwardly within the aperture 19. This will cause the wire to form a loop around the clip as shown in FIG. 6 and can enable the line to be tensioned. If a tape is used, it may be given a 180° axial twist prior to being retained in the clip in the manner described, and it has been found suitable to make the twist alternately in a clockwise or anticlockwise direction from clip to clip along the fenceline.

Figure 7A:
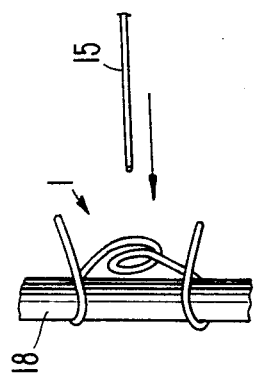
Figure 7B:
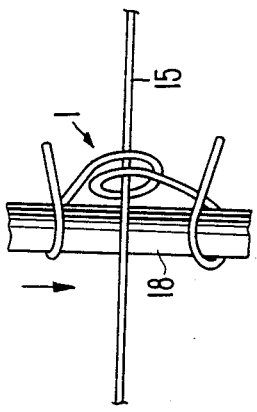

Alternatively, as illustrated by FIGS. 7a and 7b the wire or tape is firstly passed between the loops 16 and 17 and turned. The wire or tape will then be positioned in the aperture 19 of loop 6. The clip or clips are then assembled onto the posts or standards by compressing parts 9 and 10 and passing the loops 2 and 3 over the post as previously described.

Figure 8A:
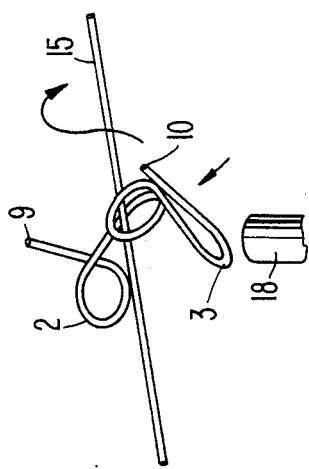
Figure 8B:
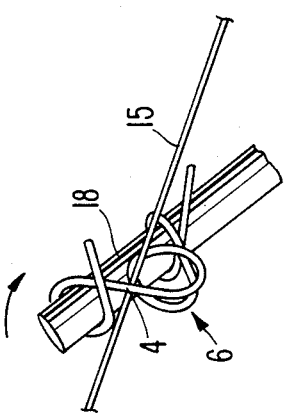

In a further alternative application the clip can be first secured to each post or standard along a line, and a wire or tape then fed directly along the line so as to pass through each aperture 19 (FIGS. 8a and 8b).

Figure 9A:
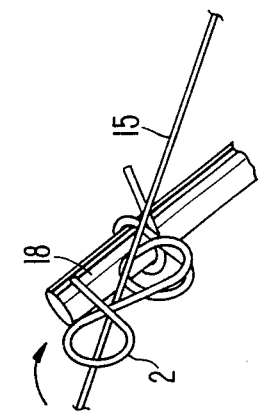
Figure 9B:
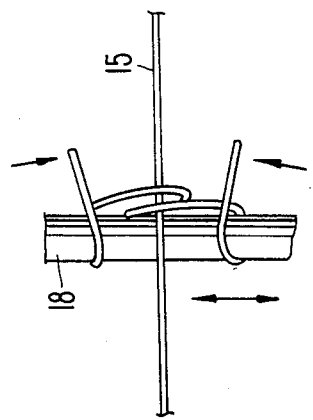

In a still further alternative application, the clip can be used to secure coated steel wire, whereby the posts are first set out along the desired fenceline, and the clips then passed onto the posts securing the wire in the gap between the face of the post, the holding part 6 and the part 4 (FIGS. 9a and 9b).

Of course by again applying pressure to the parts 9 and 10 the clip may be removed or repositioned on the post or standard 18.

Thus it can be seen that in at least the preferred form of the invention a fence clip is provided which has some advantages. In particular the clip is able to be formed from on piece and no tools are required to place it on a fence post or standard. Because the clip can be made of metal it is substantially inflammable, not susceptible to degradation by ultra-violet light and has no plasticisers to leach out. It will grip a post or standard firmly yet is able to be easily removed or relocated. The clips can be formed to be engagable on substantially any desired rod thereby a standard rod is not required. The construction is also safe to use and a minimum size range will cover all nominal rod diameters. The clip is also somewhat tolerant of variations in shaft diameter and cross-sectional roundness and the fence element can be positioned at any point. Once in position the wire or tape cannot readily be dislodged and the clip is substantially resistant to degradation by adverse weather conditions, is comfortable to use and easy to carry and keep. Any tendancy of the clip to "walk" down a rod through for example harmonic vibrations, for example, on an exposed ridge conditions is low. The construction is also readily applied to right or left handed situations and also can be used in "gateway" applications. A further advantage arises from the fact that since the wire or tape 15 is retained, by the clip in a compete loop 19, the clip can be retained on the wire or tape after removal from a fence post or standard 18 and thus the possibility of loss is minimised. The wire or tape is able to run freely in the clip, and in certain applications need not be twisted or brought into contact with sharp edges which can cause fraying. In other applications it may be twisted on retention by the clip, thus enabling the line to be tensioned. The clip may be used effectively on either main rods or outriggers and is suitable for providing temporary repairs to standard fencing. The clips are so designed as to be conveniently stored in a stack or magazine. In some applications at least the parts 9 and 10 may be advantageously plastics-dipped to cover any sharp edges and/or to insulate the operator and/or for purposes of colour coding. The clip has little tendency to retain precipitated water.

What is claimed is:

1. A fence clip of elongated wire-like material, said fence clip comprising:
    a pair of spaced apart loops resiliently biased into planes inclined one to another;
    manually actuable lever means attached to said pair of loops for resiliently moving said pair of loops towards parallel planes relative to one another against the resilient bias thereof and for simultaneously increasing the apparent diameter of each one of said pair of loops when viewed along an axis passing through each one of said pair of loops, and each one of said pair of loops being sufficiently large for causing the apparent diameter of each one of said pair of loops to encircle a fence post or standard for being placed thereon when said lever means biases said loops towards parallel planes, and each one of said pair of loops gripping an encircled post or standard when said lever means no longer biases said pair of loops towards parallel planes and said pair of loops returns to planes inclined one to another; and
    holding means attached to said pair of loops for holding a wire, tape, or the like.

2. A fence clip as claimed in claim 1, wherein each one of said pair of spaced apart loops includes a single loop.

3. A fence clip as claimed in claim 2, wherein said holding means includes a further loop, and said further loop lies in a plane substantially at right angles to said pair of spaced apart loops.

4. A fence clip as claimed in claim 3, wherein parts of said elongated wire-like material between said further loop and each one of said pair of spaced apart loops lie in inclined planes one to the other, and actuation of said manually actuable lever means moves said parts towards a position where said parts lie substantially in a single plane.

5. A fence clip as claimed in claim 4, wherein said manually actuable lever means includes extensions of said elongated wire-like material beyond said spaced apart loops, and each said elongated material extension is positioned on an axis substantially parallel to the longitudinal axis passing through said further loop.

6. A fence clip as claimed in claim 3, wherein said further loop has more than one turn, and the overlapping parts of said more than one turn are spaced apart.

* * * * *